(12) United States Patent
Lee et al.

(10) Patent No.: US 8,743,321 B2
(45) Date of Patent: Jun. 3, 2014

(54) LIQUID CRYSTAL DISPLAY

(75) Inventors: Mikyung Lee, Gumi-si (KR); Hyunsuk Jin, Daegu (KR)

(73) Assignee: LG Display Co., Ltd., Seoul (KR)

( * ) Notice: Subject to any disclaimer, the term of this patent is extended or adjusted under 35 U.S.C. 154(b) by 282 days.

(21) Appl. No.: 12/781,469

(22) Filed: May 17, 2010

(65) Prior Publication Data
US 2011/0090430 A1    Apr. 21, 2011

(30) Foreign Application Priority Data

Oct. 20, 2009    (KR) .................. 10-2009-0099887

(51) Int. Cl.
*G02F 1/1335*    (2006.01)
(52) U.S. Cl.
USPC ............................................. 349/96; 349/13
(58) Field of Classification Search
USPC ...................................................... 349/13, 96
See application file for complete search history.

(56) References Cited

U.S. PATENT DOCUMENTS

| 5,897,727 | A * | 4/1999 | Staral et al. ..................... 156/99 |
| 6,583,833 | B1 * | 6/2003 | Kashima ......................... 349/98 |
| 2006/0132687 | A1 * | 6/2006 | Chang et al. .................. 349/117 |
| 2008/0049174 | A1 * | 2/2008 | Kim ................................ 349/96 |
| 2009/0115823 | A1 * | 5/2009 | Matsuo et al. ................. 347/71 |

FOREIGN PATENT DOCUMENTS

| CN | 101086586 A | 12/2007 |
| CN | 101295092 A | 10/2008 |
| CN | 101339322 A | 1/2009 |

* cited by examiner

*Primary Examiner* — Jerry Blevins
(74) *Attorney, Agent, or Firm* — McKenna Long & Aldridge LLP

(57) ABSTRACT

A liquid crystal display is disclosed. The liquid crystal display includes a liquid crystal display panel including an upper substrate, a lower substrate, and a liquid crystal layer between the upper substrate and the lower substrate, an upper polarizing plate including a first λ/4 plate positioned on the upper substrate of the liquid crystal display panel, a first linear polarizer positioned on the first λ/4 plate, and a second λ/4 plate displayed on the first linear polarizer, and a lower polarizing plate including a third λ/4 plate positioned on the lower substrate of the liquid crystal display panel and a second linear polarizer positioned on the third λ/4 plate.

3 Claims, 5 Drawing Sheets

ON STATE

ON STATE

OFF STATE

LIQUID CRYSTAL DISPLAY

This application claims the benefit of Korean Patent Application No. 10-2009-0099887 filed on Oct. 20, 2009, the entire contents of which is incorporated herein by reference for all purposes as if fully set forth herein.

BACKGROUND OF THE INVENTION

1. Field of the Invention

Exemplary embodiments of the invention relate to a liquid crystal display.

2. Discussion of the Related Art

Active matrix type liquid crystal displays display a motion picture using a thin film transistor (TFT) as a switching element. The active matrix type liquid crystal displays have been implemented in televisions as well as display devices in portable devices such as office equipments and computers, because of the thin profile of the active matrix type liquid crystal displays. Accordingly, cathode ray tubes (CRT) are being rapidly replaced by active matrix type liquid crystal displays. The liquid crystal display includes a liquid crystal display panel and a backlight unit irradiating light to the liquid crystal display panel.

Recently, demand for polarized sunglasses is rapidly increasing. The polarized sunglasses polarize diffusively reflected natural light. A user wearing the polarized sunglasses can clearly see an object through the polarized sunglasses without glitter. Accordingly, the polarized sunglasses may help the user to safely drive and protect his or her eyes in outdoor activities.

When the user wearing the polarized sunglasses sees an image displayed on the liquid crystal display, there is the case where the user wearing the polarized sunglasses cannot see the image displayed on the liquid crystal display. For example, as shown in FIG. 1, when a light absorption axis 11 of an upper polarizing plate (or analyzer) 10 of a liquid crystal display panel and a light absorption axis 13 of polarized sunglasses 12 form a right angle (i.e., 90°), the polarized sunglasses 12 do not transmit light passing through the upper polarizing plate 10 of the liquid crystal display panel. As shown in FIG. 2, when the light absorption axis 11 of the upper polarizing plate 10 of the liquid crystal display panel and the light absorption axis 13 of the polarized sunglasses 12 meet each other, the polarized sunglasses 12 may transmit light passing through the upper polarizing plate 10 of the liquid crystal display panel. Accordingly, a method has been required to see the image displayed on the liquid crystal display panel through the polarized sunglasses 12 irrespective of an angle between the light absorption axis 11 of the upper polarizing plate 10 of the liquid crystal display panel and the light absorption axis 13 of the polarized sunglasses 12. For this, a polarization compensation film may be added to the upper polarizing plate 10 of the liquid crystal display panel. In this case, a thickness of the upper polarizing plate 10 may increase. If a difference between the thickness of the upper polarizing plate 10 and a thickness of a lower polarizing plate (not shown) of the liquid crystal display panel increases, the liquid crystal display panel may be bent because of a difference between residual stresses of upper and lower substrates of the liquid crystal display panel.

SUMMARY OF THE INVENTION

Exemplary embodiments of the invention provide a liquid crystal display enabling an user wearing polarized sunglasses to see an image displayed on a liquid crystal display panel irrespective of an angle between a light absorption axis of an upper polarizing plate of the liquid crystal display panel and a light absorption axis of the polarized sunglasses and capable of preventing a bending phenomenon of the liquid crystal display panel.

In one aspect, there is a liquid crystal display comprising a liquid crystal display panel including an upper substrate, a lower substrate, and a liquid crystal layer between the upper substrate and the lower substrate, an upper polarizing plate including a first λ/4 plate positioned on the upper substrate of the liquid crystal display panel, a first linear polarizer positioned on the first λ/4 plate, and a second λ/4 plate displayed on the first linear polarizer, and a lower polarizing plate including a third λ/4 plate positioned on the lower substrate of the liquid crystal display panel and a second linear polarizer positioned on the third λ/4 plate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
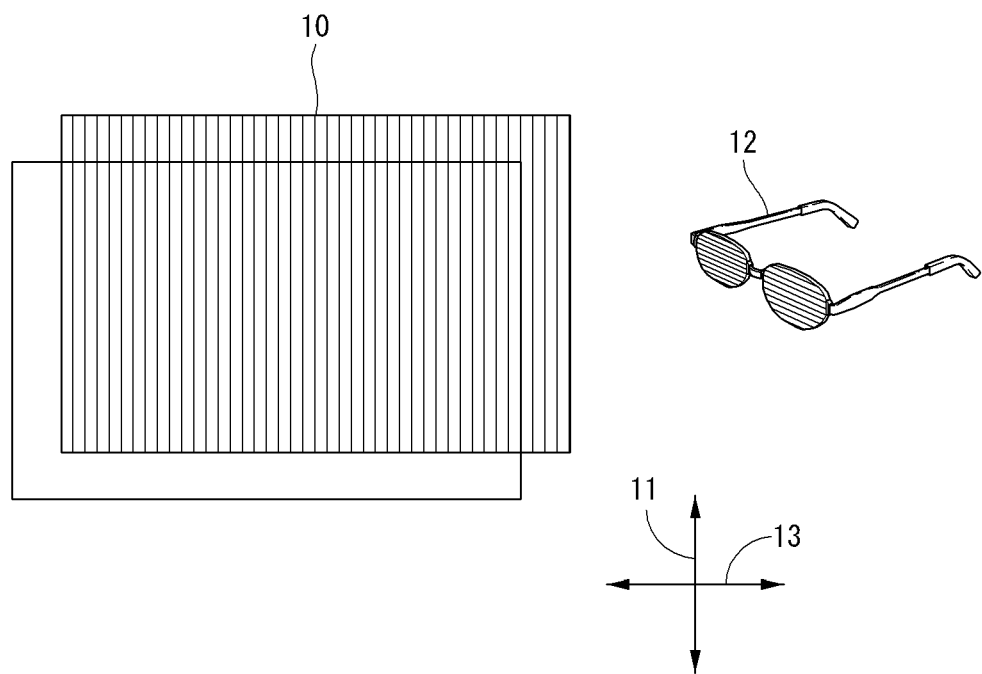
FIGS. 1 and 2 illustrate an example where a user cannot see an image displayed on a liquid crystal display panel depending on an angle between a light absorption axis of an upper polarizing plate of the liquid crystal display panel and a light absorption axis of polarized sunglasses.
Figure 2:
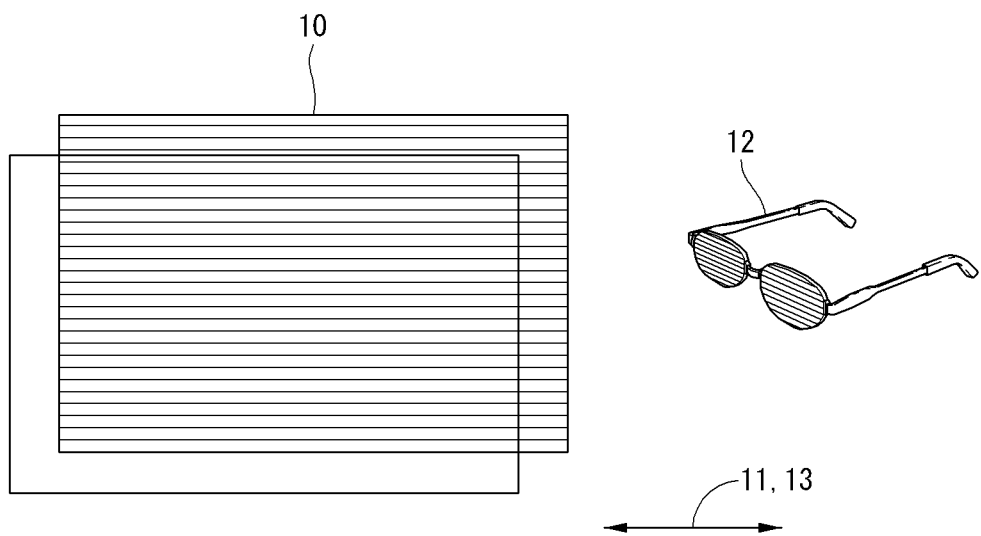

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

Names of elements used in the following description are selected in consideration of facility of specification preparation. Thus, the names of the elements may be different from names of elements used in a real product.

A liquid crystal display according to an exemplary embodiment of the invention may be applied to a display device of a portable mobile terminal such as a cellular phone, a smart phone, a notebook computer, a digital broadcasting terminal, a personal digital assistants (PDA), a portable multimedia player (PMP), and a navigation terminal, a display device of office equipments, a television, and the like.

Figure 3:
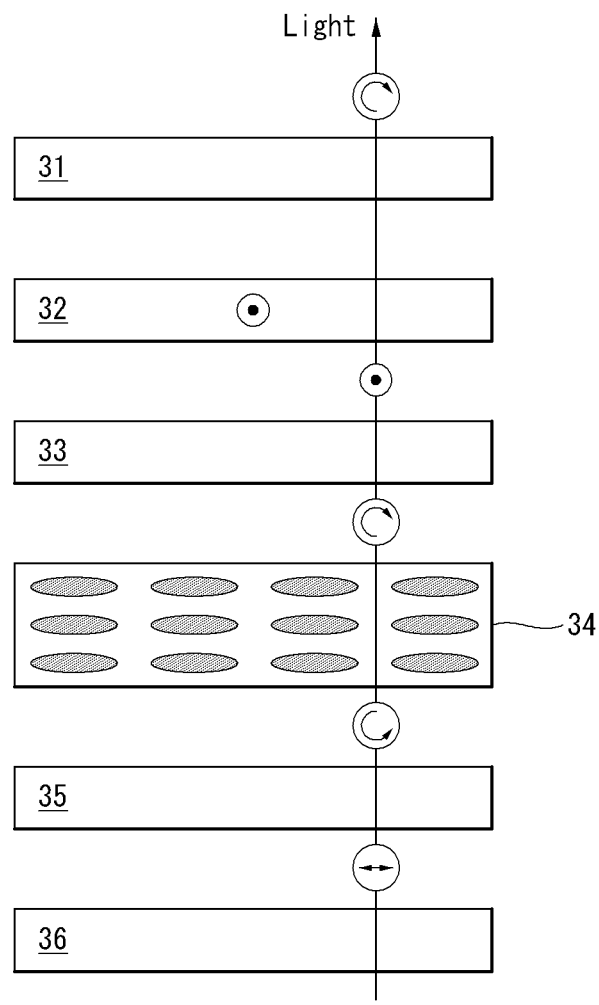
FIGS. 3 and 4 respectively illustrate on-state and off-state of a liquid crystal display according to an exemplary embodiment of the invention.
Figure 4:
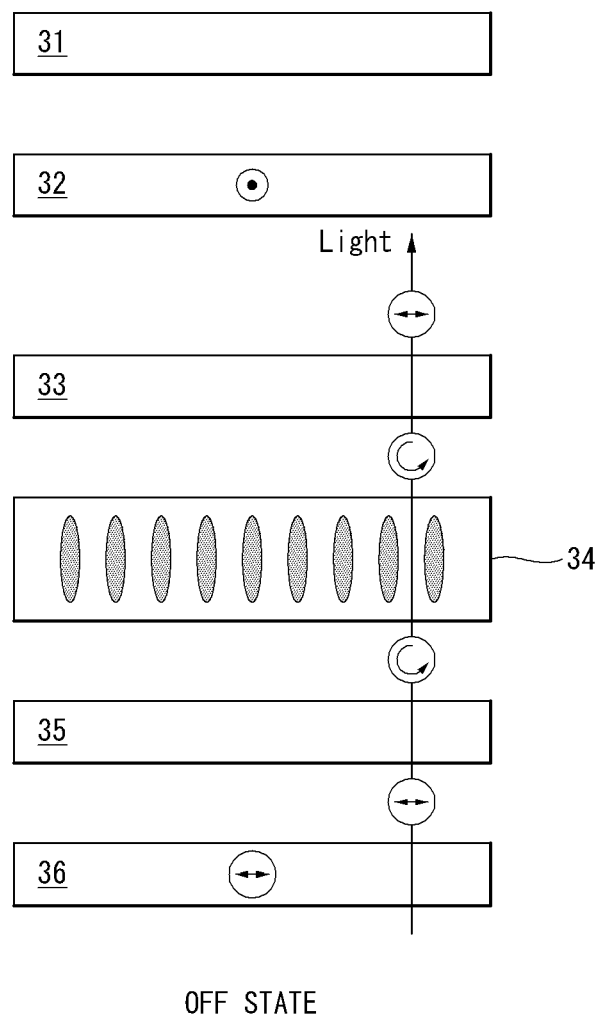

FIGS. 3 and 4 respectively illustrate on-state and off-state of a liquid crystal display according to an exemplary embodiment of the invention.

As shown in FIGS. 3 and 4, a liquid crystal display according to an exemplary embodiment of the invention includes upper polarizing plates 31, 32, and 33 attached to an upper substrate of a liquid crystal display panel and lower polarizing plates 35 and 36 attached to a lower substrate of the liquid crystal display panel. A backlight unit for irradiating light to the liquid crystal display panel may be positioned under the lower polarizing plates 35 and 36.

The liquid crystal display panel includes the upper substrate and the lower substrate that are positioned opposite each other with a liquid crystal layer 34 interposed therebetween, thereby displaying video data. The lower substrate of the liquid crystal display panel includes a thin film transistor (TFT) array formed on a lower glass substrate. The TFT array includes data lines, gate lines crossing the data lines, TFTs respectively positioned at crossings of the data lines and the gate lines, pixel electrodes connected to the TFTs, storage capacitors connected to the pixel electrodes, and the like.

The upper substrate of the liquid crystal display panel includes a color filter array formed on an upper glass substrate. The color filter array includes a black matrix, a color filter, a common electrode, and the like.

The liquid crystal layer 34 interposed between the upper substrate and the lower substrate of the liquid crystal display panel may be implemented in a vertical alignment (VA) mode. The VA mode liquid crystal display vertically aligns liquid crystal molecules, lays the liquid crystal molecules (refer to FIG. 3) by applying a voltage to the pixel electrode and the common electrode to form an electric field between the upper substrate and the lower substrate, and adjusts a data voltage applied to the pixel electrode based on video data, thereby representing a gray scale through an adjustment of lying angles of the liquid crystal molecules.

The upper polarizing plates 31, 32, and 33 include a first $\lambda/4$ (where $\lambda$, is a wavelength of light) plate 33 positioned on the upper substrate of the liquid crystal display panel, a first linear polarizer 32 positioned on the first $\lambda/4$ plate 33, and a second $\lambda/4$ plate 31 displayed on the first linear polarizer 32. The first $\lambda/4$ plate 33 retards a phase of light passing through the liquid crystal layer 34 by 45°, and the second $\lambda/4$ plate 31 retards a phase of light passing through the first linear polarizer 32 by 45°. The first linear polarizer 32 is positioned between the first $\lambda/4$ plate 33 and the second $\lambda/4$ plate 31 and transmits only first linearly polarized light from the first $\lambda/4$ plate 33.

The lower polarizing plates 35 and 36 include a third $\lambda/4$ plate 35 positioned on the lower substrate of the liquid crystal display panel and a second linear polarizer 36 positioned on the third $\lambda/4$ plate 35. The third $\lambda/4$ plate 35 retards a phase of light passing through the second linear polarizer 36 by 45° and converts the retarded light into left circularly polarized light (or left elliptically polarized light). The second linear polarizer 36 is positioned between the backlight unit and the third $\lambda/4$ plate 35 and transmits only second linearly polarized light from the backlight unit.

A light absorption axis of the first linear polarizer 32 and a light absorption axis of the second linear polarizer 36 cross each other at about 90°.

As shown in FIG. 3, the VA mode liquid crystal molecules are laid between the upper substrate and the lower substrate of the liquid crystal display panel in an on-state where the electric field is applied to the upper substrate and the lower substrate of the liquid crystal display panel. When the backlight unit is turned on in the on-state shown in FIG. 3, the second linearly polarized light passing through the second linear polarizer 36 is converted into left circularly polarized light (or left elliptically polarized light) through the third $\lambda/4$ plate 35.

Then, the left circularly polarized light (or the left elliptically polarized light) is phase retarded by $\lambda/2$ while passing through the liquid crystal layer 34 and thus is converted into right circularly polarized light (or right elliptically polarized light). The right circularly polarized light (or the right elliptically polarized light) is phase retarded by $\lambda/2$ through the first $\lambda/4$ plate 33 and thus is converted into the first linearly polarized light. The first linearly polarized light passes through the first linear polarizer 32 and then is phase retarded by $\lambda/2$ through the second $\lambda/4$ plate 31 to be converted into right circularly polarized light (or right elliptically polarized light). Hence, the right circularly polarized light (or the right elliptically polarized light) is transmitted to the outside.

Polarized sunglasses may transmit a portion of circularly polarized light. Thus, a user wearing the polarized sunglasses can see an image displayed on the liquid crystal display irrespective of an angle between the light absorption axis of the upper polarizing plate and the light absorption axis of the polarized sunglasses.

The upper polarizing plates 31, 32, and 33 of the liquid crustal display panel have the structure in which one $\lambda/4$ plate is added to the structure of the lower polarizing plates 35 and 36. Thus, because there is hardly a difference between the thickness of the upper polarizing plates 31, 32, and 33 and the thickness of the lower polarizing plates 35 and 36 in the exemplary embodiment of the invention, a bending phenomenon of the liquid crustal display panel resulting from the thickness difference between the upper substrate and the lower substrate of the liquid crustal display panel may be greatly reduced.

As shown in FIG. 4, the VA mode liquid crystal molecules stand between the upper substrate and the lower substrate of the liquid crystal display panel in an off-state where the electric field is not applied to the upper substrate and the lower substrate of the liquid crystal display panel. When the backlight unit is turned on in the off-state shown in FIG. 4, the second linearly polarized light passing through the second linear polarizer 36 is converted into left circularly polarized light (or left elliptically polarized light) through the third $\lambda/4$ plate 35. Then, the left circularly polarized light (or the left elliptically polarized light) is phase retarded by $\lambda/2$ through the first $\lambda/4$ plate 33 while passing through the liquid crystal layer 34 and thus is converted into the second linearly polarized light. The second linearly polarized light passing through the first $\lambda/4$ plate 33 does not pass through the first linear polarizer 32.

Figure 5:
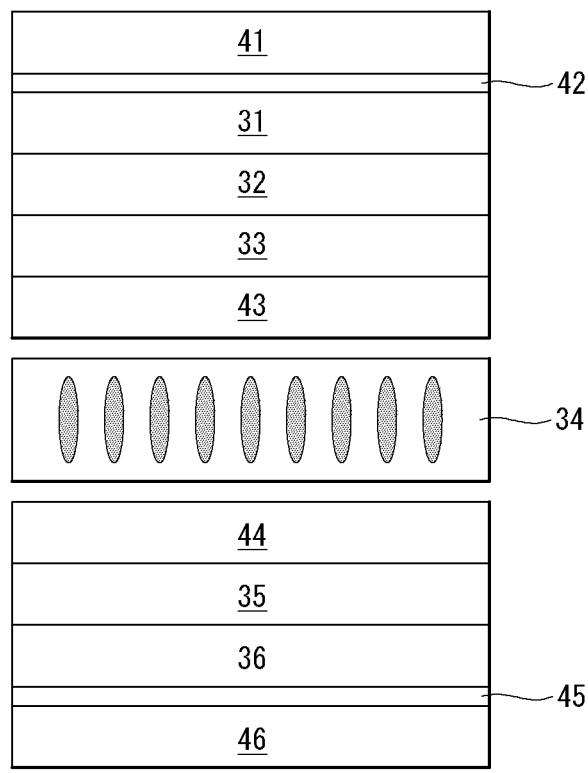
FIG. 5 is a cross-sectional view illustrating structures of an upper polarizing plate and a lower polarizing plate of a liquid crystal display according to an exemplary embodiment of the invention.

FIG. 5 is a cross-sectional view illustrating structures of the upper polarizing plates 31, 32 and 33 and the lower polarizing plates 35 and 36.

As shown in FIG. 5, the upper polarizing plates 31, 32, and 33 further include an adhesion agent 43, an adhesive 42, and a protective film 41.

The adhesion agent 43 adheres the first $\lambda/4$ plate 33 to the upper substrate of the liquid crystal display. The adhesion agent 43 is selected as a material capable of easily attaching and detaching to and from an object (for example, the first $\lambda/4$ plate and the upper substrate of the liquid crystal display in the embodiment of the invention) without a complex curing process unlike a general adhesive. For example, a pressure sensitive adhesive (PSA) may be used as the adhesion agent 43. Other materials may be used for the adhesion agent 43. The adhesive 42 attaches the second $\lambda/4$ plate 31 to the protective film 41. The protective film 41 protects the elongated first linear polarizer 32 and the elongated second $\lambda/4$ plate 31 from an external scratch or an external impact. The protective film 41 may use triacetyl cellulose (TAC). Other materials may be used for the protective film 41. The first linear polarizer 32 may use polyvinyl alcohol (PVA). Other materials may be used for the first linear polarizer 32.

The lower polarizing plates 35 and 36 further include an adhesion agent 44, an adhesive 45, and a protective film 46.

The adhesion agent 44 adheres the third λ/4 plate 35 to the lower substrate of the liquid crystal display. The PSA may be used as the adhesion agent 44. Other materials may be used for the adhesion agent 44. The adhesive 45 attaches the second linear polarizer 36 to the protective film 46. The protective film 46 protects the elongated second linear polarizer 36 and the elongated third λ/4 plate 35 from an external scratch or an external impact. The protective film 46 may use TAC. Other materials may be used for the protective film 46. The second linear polarizer 36 may use PVA. Other materials may be used for the second linear polarizer 36.

As described above, the liquid crystal display according to the exemplary embodiment converts light travelling toward the polarized sunglasses through the upper polarizing plate into circularly polarized light (or elliptically polarized light) by adding two λ/4 plates to the upper polarizing plate and adding one λ/4 plate to the lower polarizing plate. As a result, the user wearing the polarized sunglasses can see an image displayed on the liquid crystal display panel irrespective of an angle between the light absorption axis of the upper polarizing plate of the liquid crystal display panel and the light absorption axis of the polarized sunglasses. Furthermore, the bending phenomenon of the liquid crystal display panel can be greatly reduced by reducing a difference between the thicknesses of the upper polarizing plate and the lower polarizing plate of the liquid crystal display panel.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display comprising:
a liquid crystal display panel including an upper substrate, a lower substrate, and a liquid crystal layer between the upper substrate and the lower substrate;
an upper polarizing plate including a first λ/4 plate positioned on the upper substrate of the liquid crystal display panel, a first linear polarizer positioned on the first λ/4 plate, and a second λ/4 plate displayed on the first linear polarizer;
a lower polarizing plate including a third λ/4 plate positioned on the lower substrate of the liquid crystal display panel and a second linear polarizer positioned on the third λ/4 plate; and
polarized sunglasses having a light absorption axis different from a light absorption axis of the first linear polarizer,
wherein the upper polarizing plate further includes:
a first protective film positioned on the second λ/4 plate;
a first adhesion agent for attaching and detaching to the first λ/4 plate and the upper substrate of the liquid crystal display panel without a curing process; and
a first adhesive for attaching the second λ/4 plate to the first protective film, and
wherein the first adhesion agent is a pressure sensitive adhesive.

2. The liquid crystal display of claim 1, wherein the lower polarizing plate further includes:
a second protective film positioned on the second linear polarizer;
a second adhesion agent for adhering the third λ/4 plate to the lower substrate of the liquid crystal display panel; and
a second adhesive for attaching the second linear polarizer to the second protective film.

3. The liquid crystal display of claim 1, wherein the liquid crystal layer of the liquid crystal display panel includes liquid crystal molecules of a vertical alignment (VA) mode.

* * * * *